July 25, 1933.   V. NIELSEN   1,919,703
APPARATUS FOR WATERING OR SPRAYING GARDENS AND THE LIKE
Filed Aug. 1, 1931   2 Sheets-Sheet 1
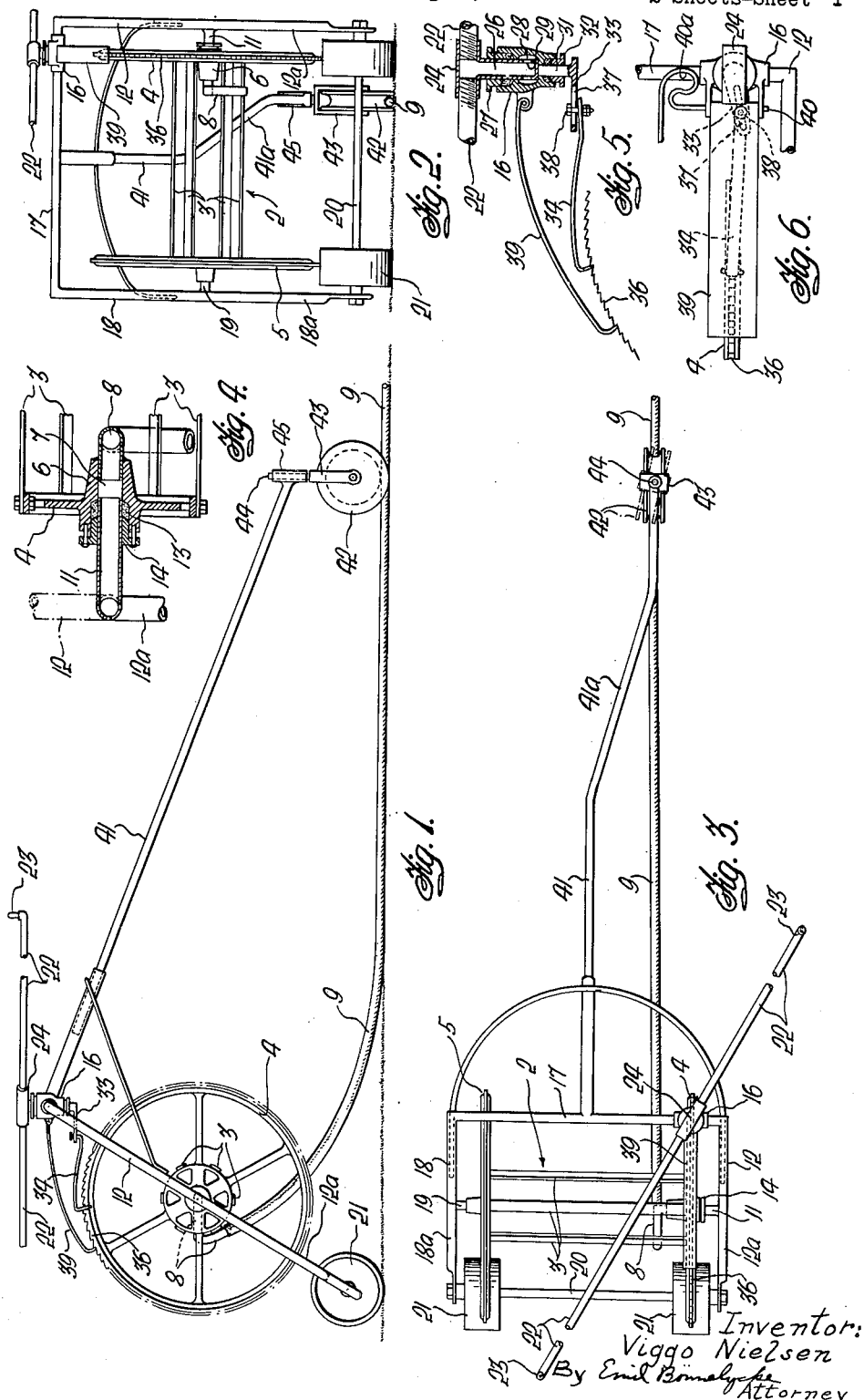
Inventor:
Viggo Nielsen
By Emil Bonnelycke
Attorney July 25, 1933.    V. NIELSEN    1,919,703
APPARATUS FOR WATERING OR SPRAYING GARDENS AND THE LIKE
Filed Aug. 1, 1931    2 Sheets-Sheet 2

Inventor:
Viggo Nielsen
By Emil Bønnelycke
Attorney

Patented July 25, 1933

1,919,703

UNITED STATES PATENT OFFICE

VIGGO NIELSEN, OF BALWYN, MELBOURNE, AUSTRALIA

APPARATUS FOR WATERING OR SPRAYING GARDENS AND THE LIKE

Application filed August 1, 1931, Serial No. 554,529, and in Australia August 1, 1930.

This invention relates to apparatus for watering or spraying lawns, gardens, and the like. More particularly the invention relates to self propelling sprinklers or spraying apparatus of the kind having a mobile frame or carriage supporting a sprinkler device which is connected to one end of a water supply hose, and in which the pressure or flow of water is utilized to impart motion to the carriage. In apparatus of this kind it has been proposed to drag or draw the carriage over the desired area by means of a cable which is anchored at one end of the area to be watered and is wound around a drum or winch which is mounted on the carriage and operated by the pressure or flow of the water.

It has also been proposed to utilize a water supply hose as a means of drawing the carriage over the ground by diverting some of the water from the hose to a water motor connected by gearing to a hose reel on or forming part of the carriage whereby rotation of the reel causes the hose to be wound thereon to draw the carriage towards the desired point.

The general object of the present invention is to provide an improved and practicable spraying apparatus wherein the water supply hose is utilized to draw the carriage over the ground, and which will enable any desired area to be thoroughly and efficiently watered or sprayed expeditiously and with a minimum of labour and attention.

A more specific object of the invention is to provide for automatic steering or guiding of the carriage so that it may be caused to follow any desired predetermined path, not necessarily straight but which may for instance be curved, tortuous or zig-zag. The ability of the apparatus to steer itself renders it considerably more useful and adaptable than previously proposed devices wherein steering control is absent and the carriage can only be traversed along a straight path.

In accordance with the invention the water supply hose in addition to being utilized to draw the carriage over the ground while spraying proceeds, is also adapted, in conjunction with a steering wheel or guide member, to automatically steer the carriage along a predetermined track or path which may be straight, curved, tortuous or otherwise as desired.

For this purpose one end of the hose is connected to a suitable water supply and is laid on the ground so as to extend lengthwise of the area to be watered, the hose conveying the water to a rotary sprinkler or spray device which is supported by the carriage and transmits rotary motion to a hose reel on the carriage whereby the hose will be wound onto the drum and thus draw the carriage forwardly. A steering wheel or like member of the carriage is adapted to track along the hose on the ground and thus automatically steer the carriage according to the precise lay out of the hose.

Means may be provided to adjust the rate of travel of the carriage to suit requirements, and provision may also be made for automatically shutting off the water supply and arresting the motion of the carriage at any desired predetermined point in its travel.

Apparatus according to the invention is particularly suitable for use in parks, gardens, tennis courts, bowling greens, race courses, golf links and such like places where comparatively large expanses of lawn require to be watered.

The above and other objects and features of the invention will, however, be fully explained in the following description, it being understood that the construction and arrangement of parts may vary without departing from the spirit and scope of the invention as defined by the appended claims.

Referring to the drawings which form part of this specification—

Figure 1 is a side elevation of apparatus according to one constructional embodiment of the invention.

Figure 2 is an end view of Figure 1.

Figure 3 is a plan of Figure 1.

Figure 4 is a sectional detail of one form of water connection between a pipe which rotates with the hose reel and a non-rotating portion of the carriage.

Figure 5 is a sectional detail of one form of means for utilizing the pressure or flow of water to drive the carriage.

Figure 6 is a plan of Figure 5.

Figure 7:
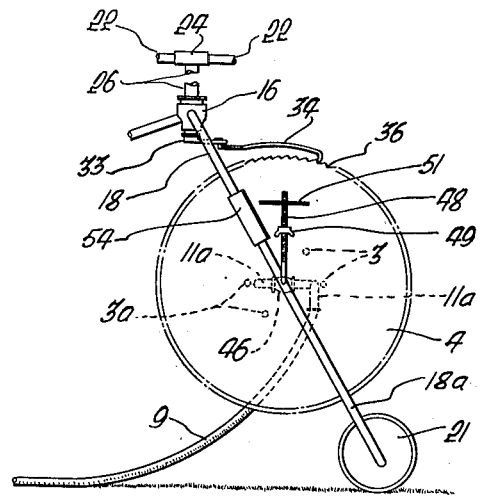
Figure 7 is a part side elevation of apparatus according to another embodiment.

Apparatus according to the invention includes a wheeled frame or carriage having a rotary hose reel 2 which may consist of a number of bars or rods 3 arranged in substantially circular formation and extending laterally between wheels or discs 4, 5 at opposite sides of the carriage. The bars 3 are attached at their ends to said wheels, one of which may be adapted to serve as a driver for the hose reel as will be described hereinafter. The other wheel or disc may consist of a relatively thin sheet metal plate or disc. The hose reel is preferably concentric with the wheels and of considerably smaller diameter.

One of the wheels, for instance, wheel 4, may have a hub 6 (Figure 4) provided with an axial bore 7 with which one end of a pipe 8 registers. This pipe may be welded, brazed or otherwise made fast to wheel 4 so as to turn with the hose reel and is adapted at its other end, which may be curved complementary to the hose reel and located near one side of the reel, to detachably receive one end of a water supply hose 9, the other end of which is adapted for connection to a water supply pipe or hydrant (not shown).

Extending into the bore 7 so as to provide an axle for the wheel 4 is a pipe 11 which may be connected to or merge at its outer end into an upstanding pipe 12 so that water from the hose passes through the pipes 8, 11 and 12 to a spray or sprinkler or spray device hereinafter referred to. Suitable packing 13 and a gland 14 may be provided to prevent leakage of water between pipe 11 and the axial bore of the wheel 4.

The pipe 12 may have an elbow or right angled bend at its upper end and be connected to one side of a casing 16 from the other side of which a tube or rod 17 may extend transversely to the other side of the carriage where it joins the top of an upstanding tube or rod 18 provided with an inturned portion 19 forming an axle for the other wheel or disc 5. Both the pipe 12 and the tube or rod 18 may have downturned extensions 12a and 18a for supporting a transverse spindle 20 upon which may be mounted a pair of comparatively small diameter wheels 21 which track upon the ground beneath the wheels 4 and 5. The wheels 21 may be adjustable longitudinally of spindle 20 in order that they may be positioned to track along furrows between rows of crops to be watered.

The members 11, 12, 12a, 17, 18, 18a and 19 thus form the frame of the carriage and rotatably support the hose reel. The said members are preferably formed of tubing, but as it is only necessary for the water to pass through members 11 and 12 the members 12a and 17 may be blocked or plugged to prevent water entering same. Or if desired the members 12a, 17, 18, 18a and 19 may be solid instead of hollow.

The sprinkler or spray device may comprise two or more hollow arms 22 provided at their outer ends with outlet orifices or nozzles 23 and connected at their inner ends to a T piece 24 having a depending hollow shank 26 (Figure 5) which passes through a gland 27 into the aforesaid casing 16 which has a chamber 28 registering with the pipe 12. The hollow shank 26 is provided with one or more ports 29 through which water passes from chamber 28 into the T piece 24 and thence to the spraying arms 22 whereby the T piece and the arms will be rotated.

In order to utilize the rotary motion created by the pressure or flow of water to turn the hose reel and advance the carriage during spraying, the shank of the T piece may have a stem 31 projecting through a gland 32 at the bottom of casing 16, this stem having a crank or arm 33 to which a pawl 34 is connected. This pawl may be adapted to engage ratchet like teeth 36 formed around the periphery of one of the wheels, say wheel 4. The wheel and the hose reel may thus be rotated which causes the hose 9 to be wound upon the reel and draw the carriage forwardly. To permit of adjustment of the rate of travel of the apparatus the arm 33 may have a longitudinal slot 37 at any desired point along which the pawl may be connected to the arm by a pin or bolt 38.

A pawl or arm 39 may be pivotally mounted to casing 16 or some other suitable part and engage the teeth 36 so as to prevent inadvertent backward travel of the carriage. The arm 39 may be rendered inoperative by swinging it upward about its pivot and retaining it in such position as by sliding the looped end 40a of member 40, which may form the pivot, underneath the inner end of the arm 39.

The aforesaid transverse frame member 17 may have connected thereto at or about its centre one end of a forwardly extending beam or rod 41 provided at its front end with a swivelling mount for a steering wheel 42 which is flanged so that it may track along the hose 9. The axle of the steering wheel 42 is preferably supported by a forked yoke 43 having an upstanding pin or stem 44 free to turn within a sleeve 45 at the front end of the beam 41.

In operation the carriage with the hose 9 wound around the hose reel 3 may be wheeled up to a water supply pipe or hydrant to which the outer end of the hose is connected. The carriage may then be wheeled backwardly to the distant end of the area to be watered, paying out the hose which may pass between the flanges of the steering wheel 42 and lie upon the ground in a straight, curved, tortuous or other path that may be desired. The apparatus is then ready for watering and upon opening the cock of the water supply pipe or hydrant the flow of water through the hose to the spraying or sprinkler device on the carriage will, as aforesaid, turn the hose reel, causing the hose to be wound thereon and thus draw the carriage forwardly towards the water supply pipe whilst spraying proceeds. The steering wheel 42 by tracking along the hose steers the carriage along the desired path which is predetermined by the particular laying out of the hose.

The swivelling mount for the steering wheel 42 enables the latter to readily negotiate any curves or deviations that may be present in the lay out of the hose and also ensures proper winding of the hose around the reel so that spiral winding proceeds from side to side of the reel with each succeeding convolution lying against the side of the previous convolution except at the sides of the reel where the direction of winding is reversed.

To ensure that the first convolution of the hose is located at one side of the reel so as to facilitate subsequent winding, the beam 41 may be offset, as at 41a in Figures 2 and 3, towards that side of the reel where the hose is connected to the pipe 11.

Spraying operations and travel of the carriage may be arrested at any time merely by turning off the water supply. However, if desired, means may be provided to automatically stop the carriage and spraying operations at any predetermined period in the travel of the carriage.

Figure 8:
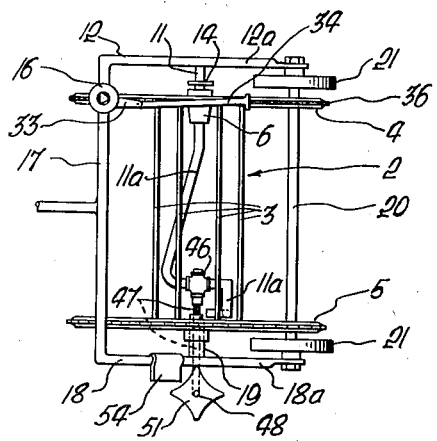
Figure 8 is a plan of Figure 7.

According to one example of such means illustrated in Figures 7 and 8 a pipe 11a may extend laterally within the hose reel 2 from the axial bore of wheel hub 6 to the other side of the carriage and terminate near the wheel or disc 5 where it may be adapted for connection to the hose 9. A valve 46 may be interposed in pipe 11a and have its spindle 47 projecting axially and freely through the axle member 19 of wheel 5. This spindle 47 may be bent to have a radially extending portion 48 at the outside of wheel 5 and may be screw threaded to receive a wing nut or other suitable adjustable stop 49. Also screwed onto the radial portion 48 of spindle 47 and nearer its free or outer end than nut 49 is a star or similar shaped plate or member 51 having circumferentially spaced projections or ears and intervening recesses. Normally the valve 46 is open, and the valve and its spindle move around with the hose reel. The star or like member 51 is aligned with and adapted once during every rotation of the hose reel 2 to engage a stationary shoulder or projection which may consist of a plate 54 secured to and projecting sidewardly from the side tube or rod 18 of the frame. Unless the nut 49 is hard up against the star member 51 such engagement will merely cause the star member to be partially turned around the screw spindle. It will be obvious that each partial turn of the star member brings it nearer to the nut so that eventually when the star member and the nut are abutted the next engagement of the star member with the shoulder or projection 54 will result in the axial portion of the spindle 47 being turned in relation to the valve casing to thereby close the valve and thus arrest the motion of the carriage and the action of the sprinkler device. By appropriate setting of the star member 51 and the nut 49 on the radial spindle 48 the action of the apparatus may be arrested at any desired predetermined position.

Figure 9:
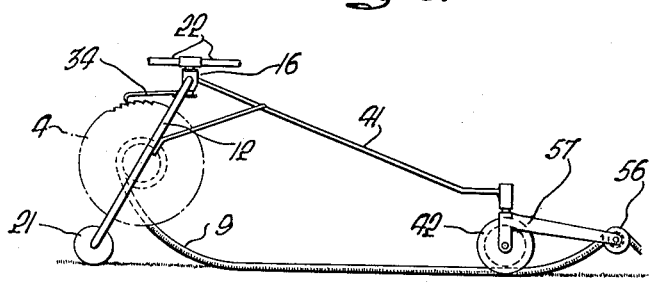
Figure 9 is a somewhat diagrammatic view in side elevation of the apparatus showing a modification of the steering means.

In the modification illustrated in Figure 9 a second wheel or roller 56 is supported clear of the ground in advance of steering wheel 42 and the hose 9 passes around the upper part of wheel 56. Such an arrangement may be preferable in instances where the apparatus is required to travel over comparatively rough or uneven ground as the lifting of the hose in advance of the wheel 42 facilitates the tracking of the latter over the hose. The hose lifting wheel 56 or roller may be of relatively small diameter and may be supported by a bracket 57. Bracket 57 is intended to swivel with the mount for the steering wheel 42.

Having now described my invention what I claim as new and desire to secure by Letters Patent is—

1. Improved self propelling watering or spraying apparatus consisting in the combination of a mobile carriage or frame carrying a reaction sprinkler or spraying device and a hose reel, a flexible water supply hose connected from a source of supply to the reel and adapted to be wound thereon, a conduit arranged to supply water to the sprinkler from the reel, means actuated by the sprinkler upon flow of water through the hose for turning the reel to wind the hose thereon and cause the apparatus to be traversed over a desired area, and steering means associated with said carriage and including a guide member adapted to track along the said hose, whereby the carriage is automatically steered in a predetermined straight, curved or tortuous path according to the lay out of the said hose upon the ground.

2. Improved self propelling watering or spraying apparatus comprising in combination a mobile frame or carriage supporting a reaction sprinkler or spraying device and a hose reel, a flexible water supply hose adapted to be connected at one end to a water supply pipe or tap and to lie upon the ground between said supply pipe or tap and said carriage whereby water is conducted to said reel and sprinkler or spraying device, means operable by the reaction sprinkler or spraying device to rotate said hose reel in such a direction as to wind the hose thereon, and thereby automatically advance the carriage, and a guide member connected to the carriage adapted during the travel of the carriage to track along said hose between said hose reel and the water supply pipe or tap to thereby automatically steer the carriage in a predetermined straight, curved or tortuous path according to the lay of the hose on the ground.

3. Apparatus according to claim 1 wherein the means actuated by the sprinkler comprises a pawl and ratchet mechanism.

4. Apparatus according to claim 1, wherein said sprinkler or spraying device comprises a casing forming a water chamber with which said hose is placed in communication, a hollow ported member rotatably mounted in said casing in communication with said water chamber, spray pipes connected to said hollow member and provided with outlet orifices or nozzles and a pawl connected to said hollow member and adapted to engage a toothed circumferential face on said hose reel or a member attached thereto.

5. Apparatus according to claim 1, wherein said guide member is carried by a beam or pole attached to the carriage projecting forwardly of said hose reel.

6. Apparatus according to claim 1, wherein said guide member consists of a wheel having flanges for disposition one at each side of the hose.

7. Apparatus according to claim 1, wherein said guide member is mounted so as to be capable of swivelling movement in a substantially horizontal plane.

8. Apparatus according to claim 1, wherein said guide member is mounted on a yoke adapted to swivel on a beam or pole projecting from said carriage in advance of said hose reel.

9. Apparatus according to claim 1, wherein said guide member is mounted on a beam or pole which projects from said carriage forwardly of the hose reel thereon and is offset sidewardly in relation to said hose reel.

10. Apparatus according to claim 1 in combination with a second guide member arranged to lift the hose clear of the ground in advance of the first mentioned guide member.

11. Apparatus according to claim 1 in combination with means for automatically arresting the action of the apparatus at a predetermined point or period.

12. Apparatus according to claim 1 in combination with a normally open valve interposed in the conduit extending between said hose and said sprinkler or spraying device and adjustable means for automatically closing said valve when the carriage reaches a predetermined point in its travel.

13. Apparatus according to claim 1 in combination with a normally open valve interposed in the conduit connected to the discharge end of the hose and having a portion extending axially through the hose reel to said sprinkler or spraying device and adjustable means actuated by the rotation of said hose reel for automatically closing said valve when the carriage reaches a predetermined point in its travel.

14. Apparatus according to claim 1 in combination with a normally open valve interposed in the conduit connected to the discharge end of the hose and having a portion extending axially through the hose reel to said sprinkler or spraying device, said valve being adapted to turn bodily with said hose reel and the spindle of said valve being extended axially of said hose reel and having a screw threaded portion fitted with a star-like member and an adjustable stop, said star-like member being aligned with a stationary shoulder which it engages once during each rotation of the hose reel until the star-like member is abutted against said stop whereupon the axial portion if said spindle is turned in relation to the valve casing to thereby close said valve.

15. Apparatus according to claim 1, the said sprinkler or spraying device comprising a casing forming a water chamber with which said hose is placed in communication, a hollow ported member rotatably mounted in said casing in communication with said water chamber, spray pipes connected to said hollow member and provided with outlet orifices or nozzles, upwardly extending side frame members mounted on the carriage and interconnected at their upper ends by a transverse member, a spindle extending laterally between the lower ends of said side members, ground wheels on said spindle, said side members having stub axles for rotatably supporting said hose reel, the said conduit comprising one of said axles, said latter axle being connected with a portion of one of said side frame members which is hollow and provides communication between said hollow axle and the interior of said casing whereby water may pass therethrough to said spray pipes.

16. Apparatus according to claim 1, wherein said means actuated by the sprinkler includes means for varying the rotary speed ratio between said sprinkler or spraying device and said hose reel.

VIGGO NIELSEN.